R. C. JEBOULT.
SUNSHADE FOR PNEUMATIC TIRES.
APPLICATION FILED DEC. 4, 1916.
1,220,750.
Patented Mar. 27, 1917.
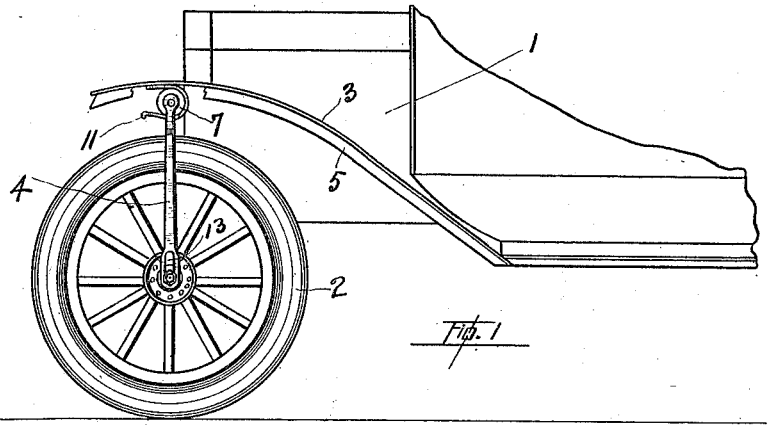
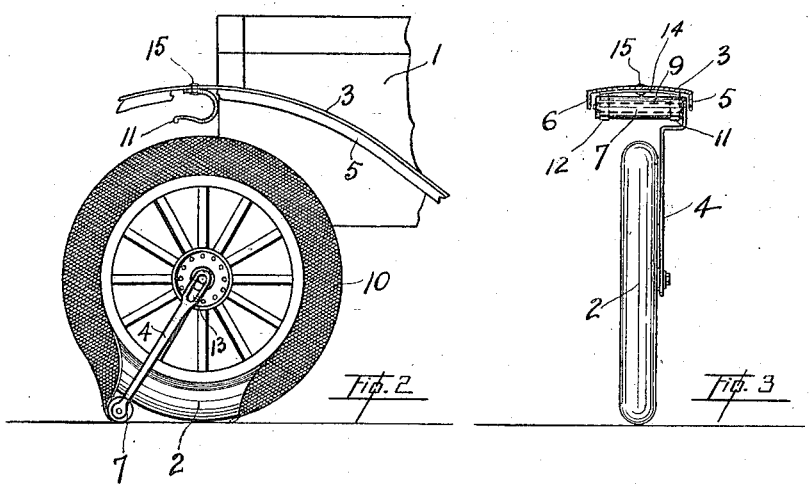
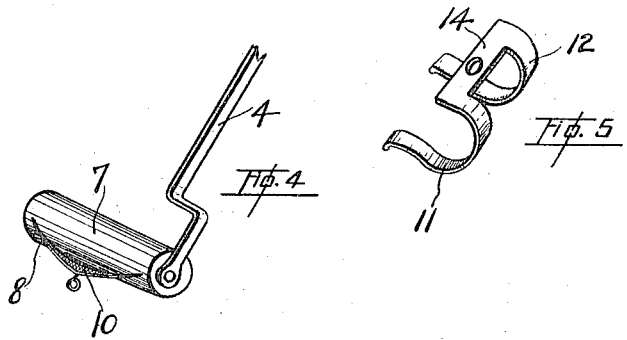
INVENTOR.
REGINALD CALLAWAY JEBOULT.

UNITED STATES PATENT OFFICE.

REGINALD CALLAWAY JEBOULT, OF EDMONDS, BRITISH COLUMBIA, CANADA.

SUNSHADE FOR PNEUMATIC TIRES.

1,220,750.   Specification of Letters Patent.   Patented Mar. 27, 1917.

Application filed December 4, 1916. Serial No. 135,016.

*To all whom it may concern:*

Be it known that I, REGINALD CALLAWAY JEBOULT, a subject of the King of Great Britain, and a resident of the town of Edmonds, in the Province of British Columbia, Canada, have invented certain new and useful Improvements in Sunshades for Pneumatic Tires, of which the following is a specification.

My invention relates to devices for preventing the sun's rays bearing directly on the outer casing of automobile tires, when the car is stopped, so as to prevent undue increase of pressure in the tire and consequently the blow-outs attributable to this cause, and the object of my invention is to provide a shade which is adapted to be carried normally rolled up adjacent the tire when the car is running and which may be unrolled to cover practically the whole of the surface of the tire casing on which the sun's rays bear when the car is stationary.

I attain this object by the means illustrated in the accompanying drawings in which—

Figure 1 is a side view showing my device in normal position as applied to the front tire of an automobile.

Fig. 2 is a side view showing the shade unrolled and extended around the tire.

Fig. 3 is a front view of the device in its normal position.

Fig. 4 is a perspective view of the shade casing.

Fig. 5 is a detail view of the clips.

Similar figures of reference indicate similar parts throughout the several views.

1 indicates the front part of an automobile, 2 the near side front tire, and 3 the fender. 4 indicates an arm pivoted freely at its lower end on the outer end of the hub nut so that it may be supported in a vertical position, as shown in Fig. 1, when the car is running, or swung downwardly, as shown in Fig. 2, when the car is stopped. Any suitable method of securing the lower end of the arm 4 may be employed, such as by fixing a stud rigidly into the hub nut and forming a slot 13 in the lower end of the arm which passes freely on to the end of the stud to be held thereon by a nut threaded on to the end of the stud, but other methods of pivotally mounting the arm are well known to those skilled in the art, any of which may be employed. The slot 13 is provided to allow for variations in the alinement of the car body under heavy load or when passing over stones or uneven surfaces.

The arm 4 is offset at its free end so as to enable the greatest width of shade to be used within the limits of the side flanges 5 and 6 of the fender, as shown more particularly in Fig. 3, and rigidly secured to the arm so as to extend transversely between the fender flanges is a box or casing 7 provided with a transverse slot 8 and within which casing is mounted a spring roller 9, indicated dotted in Fig. 3, which roller is adapted to operate in the same manner as the spring rollers of window shades, the operation of which is too well known to need any further description. Attached to the roller and normally wound up around same is a shade 10, which is formed of any material suitable for the purpose and is of sufficient length to extend around the tire when unrolled, as shown in Fig. 2. The free end of the shade extends normally through the slot 8 so as to be readily gripped by hand when bringing it into use. 11 and 12 indicate spring clips secured to the underside of the fender and adapted to hold the casing 7 when the device is in its normal position, and which clips are pivotally mounted on the fender so that the casing may swing in unison with the wheel as it is inclined to the left or right as the case may be. The pivotal mounting of the clips may be effected in any suitable manner, such as by forming the clips out of one piece so that a connecting bar 14 is formed, through the center of which bar a bolt or rivet 15 may be passed to connect the bar pivotally to the underside of the fender, as shown in Figs. 2 and 5.

It will, of course, be understood that the shade 10 is made much wider than the tire so that, when unrolled, it will tend to conform to the shape of the tire to cover not only the tread but also those portions of the sides of the casing which most require protection from the sun, and in order to facilitate the dropping of the edges of the shade as it is unrolled it is preferable to curve the slot 8, as indicated in Fig. 4. The edges of the shade may also be bound with elastic cord or the like so as to give an inwardly and downwardly curving tendency to the shade as it is drawn out of the casing.

The manner in which the invention is used and operates will be apparent, as it will be seen from the foregoing that the operation of the roller 9 and shade 10 is similar to that of the spring roller window shades in common use, that is, an outward pull on the free end of shade 10 will cause roller 9 to rotate to unwind the shade, while the spring of the roller will operate to rewind the shade on to the roller again when the tension thereon is relieved. Therefore, to protect the tire against the sun's rays by means of the device described, all that is necessary is to spring the casing 7 out of the clips 11 and 12, allowing the arm 4 to swing downwardly, after which the shade 10 is drawn out and carried around the tire to any desired point, thus interposing the shade between the sun's rays and the surface of the tire casing. To return the device to its normal position, the tension on the shade roller is relieved in the well known manner and the shade rewound thereon, after which the arm is swung upwardly and the casing 7 reëngaged in the clips 11 and 12.

What I claim as my invention is:

1. The combination with a pneumatic tire, of a suitably supported normally rolled up shade member, said member being adapted to be unrolled and extended around the tire.

2. The combination with a pneumatic tire, of a casing disposed normally above and transversely of the tire, said casing being provided with a slot and having rotatably mounted therein a normally rolled up shade member the free end of which extends through the said slot, and means for supporting said casing in its normal position, said means being manually operable to swing the casing circumferentially around the tire.

3. The combination with a pneumatic tire, of a casing having a slot in one side and disposed adjacent the tire, a normally rolled up shade member rotatably mounted within the casing having its free end extending through said slot, and a swingably mounted arm to the free end of which the said casing is secured, said arm being adapted when swung to carry the casing circumferentially around the tire.

4. The combination with a pneumatic tire, of an arm swingably mounted in a normally vertical position adjacent the tire, a casing carried by the upper end of said arm and disposed normally above and transversely of the tire, said casing having a slot in one side, a normally rolled up shade member rotatably mounted within the casing and having its free end extending through said slot, and means for detachably holding said casing in its normal position.

5. The combination with a pneumatic tire and fender therefor, of a casing detachably mounted on the fender adjacent the tire, said casing being provided with a slot and having rotatably mounted therein a normally rolled up shade member the free end of which extends through the said slot, and manually operable means for detaching said casing and swinging it circumferentially around the tire.

6. The combination with a pneumatic tire and fender therefor, of a casing pivotally and detachably mounted on the fender adjacent the tire, said casing being provided with a slot and having rotatably mounted therein a normally rolled up shade member the free end of which extends through the said slot, and manually operable means for detaching said casing and carrying it around the tire.

7. The combination with a pneumatic tire and fender therefor, of a casing detachably mounted on the fender adjacent the tire, said casing being provided with a slot and having rotatably mounted therein a normally rolled up shade member the free end of which extends through the said slot, and an arm having its lower end in slotted engagement with the tire hub, the upper end of said arm being secured to the said casing.

8. The combination with a pneumatic tire, of a normally vertical arm the lower end of which is in pivotal slotted engagement with the tire hub, a casing secured to the upper end of the said arm and normally disposed above and transversely of the tire, said casing having a curved slot in one side, a normally rolled up shade member rotatably mounted within the casing and having its free end extending through the said slot, and means for detachably holding the said casing in its normal position.

9. The combination with a pneumatic tire, of a normally vertical arm the lower end of which is in pivotal slotted engagement with the tire hub, a casing secured to the upper end of the said arm and normally disposed above and transversely of the tire, said casing having a curved slot, a normally rolled up shade member rotatably mounted within the casing having its free end extending through the said slot, and a pivotally mounted spring clip member in which said casing is detachably engaged when in its normal position.

Dated at Vancouver, B. C., this 18th day of November, 1916.

REGINALD CALLAWAY JEBOULT.

Copies of this patent may be obtained for five cents each, by addressing the "Commissioner of Patents, Washington, D. C."